(12) United States Patent
Gao

(10) Patent No.: US 8,150,468 B2
(45) Date of Patent: Apr. 3, 2012

(54) METHOD, SYSTEM AND BASE STATION FOR CONFIGURING MULTI-MODE BASE STATION

(75) Inventor: Xiaobo Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 314 days.

(21) Appl. No.: 12/469,250

(22) Filed: May 20, 2009

(65) Prior Publication Data

US 2009/0227262 A1    Sep. 10, 2009

Related U.S. Application Data

(63) Continuation of application No. PCT/CN2007/071063, filed on Nov. 15, 2007.

(30) Foreign Application Priority Data

Nov. 20, 2006  (CN) .......................... 2006 1 0149172

(51) Int. Cl.
    *H04B 1/38* (2006.01)
(52) U.S. Cl. ....................................... 455/561; 455/418
(58) Field of Classification Search .................. 455/561, 455/524, 186.1, 418; 709/220, 221, 222
    See application file for complete search history.

(56) References Cited

U.S. PATENT DOCUMENTS

| 2002/0123365 A1* | 9/2002 | Thorson et al. ................ 455/524 |
| 2005/0027789 A1 | 2/2005 | Luo et al. |
| 2006/0229079 A1 | 10/2006 | Cheng et al. |

FOREIGN PATENT DOCUMENTS

| CN | 1512793 | 7/2004 |
| CN | 1581993 | 2/2005 |
| CN | 1859790 | 11/2006 |

OTHER PUBLICATIONS

Written Opinion of the International Searching Authority mailed Mar. 6, 2008 in corresponding International Patent Application PCT/CN2007/071063.

* cited by examiner

*Primary Examiner* — Tu X Nguyen
(74) *Attorney, Agent, or Firm* — Staas & Halsey LLP

(57) ABSTRACT

A method and system for configuring a multi-mode base station is disclosed so that a network system may specify a radio access mode for the base station. In the present invention, a configuration control unit inside the base station reports resource capabilities of the base station to a configuration decision unit. The configuration decision unit determines a mode for the base station according to network planning and the reported resource capabilities, generates a configuration file for the base station according to the determined mode, and delivers the configuration file to the base station. The configuration control unit configures relevant resources of the base station according to the received configuration file. The base station sends a configuration request during initial startup to implement automatic configuration. At daily startup, the base station reports resource capabilities and the existing configuration file to the configuration decision unit to check whether the current configurations are valid.

15 Claims, 1 Drawing Sheet

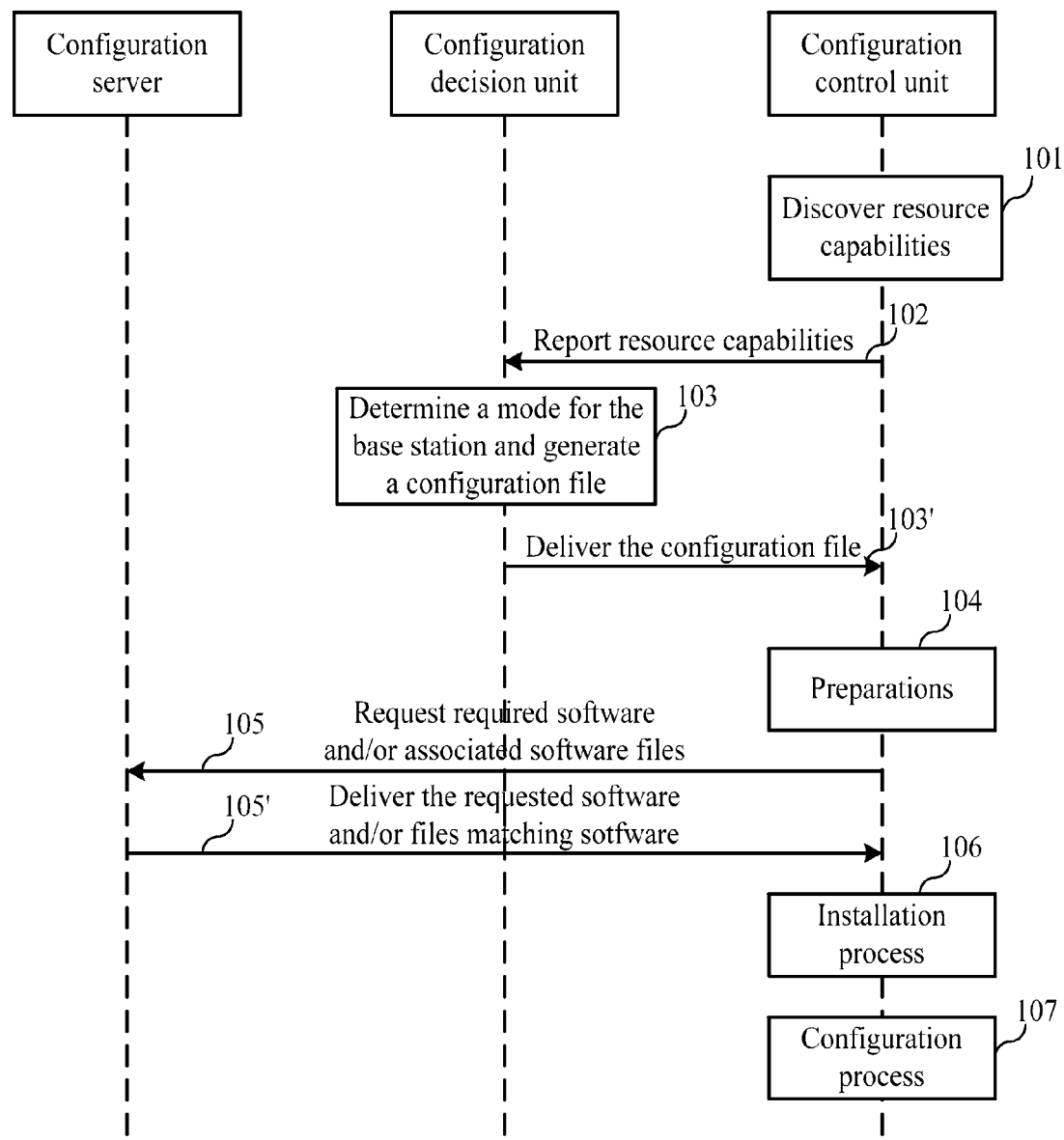

METHOD, SYSTEM AND BASE STATION FOR CONFIGURING MULTI-MODE BASE STATION

CROSS-REFERENCE TO RELATED APPLICATIONS

This application is a continuation of International Application No. PCT/CN2007/071063, filed on Nov. 15, 2007, which claims the benefit of Chinese Patent Application No. 200610149172.0, filed on Nov. 20, 2006, both of which are hereby incorporated by reference in their entireties.

FIELD OF THE INVENTION

The present invention relates to the radio communication field, and in particular, to multi-mode base station technologies.

BACKGROUND OF THE INVENTION

In recent years, communication technologies, especially the mobile communication technologies, have been developing fast. With the development of the first generation, second generation, and third generation (3G) mobile communication systems, mobile communications impose more and more impacts on people's life and work. At present, as the number of mobile subscribers increases continuously and mobile services are increasingly diversified, mobile operators all over the world attempt to attract and win mobile subscribers by fast providing new-mode services, to gain a competitive edge in the expanding market.

Two solutions in the prior art are available to implement new-mode services.

The first solution is to adopt the original mode and add new-mode base stations. Thus, an overlay communication network is formed to provide different mobile services for subscribers. In this solution, however, to construct such an overlay communication network, mobile operators need to invest an enormous sum of money, especially in the capital expenditure (CAPEX) and operation expenditure (OPEX), for equipment purchase, site acquisition, site construction, and network operation and maintenance.

The second solution is to install old-mode modules and new-mode modules in the same cabinet to implement multi-mode base stations, that is, to insert the baseband boards of different modes into the same baseband subrack in a base station. For example, the baseband boards of different radio air interface modes such as the global system for mobile communications (GSM), wideband code division multiple access (WCDMA), and code division multiple access 2000 (CDMA2000) are inserted to form a multi-mode base station. The implementation method is to allocate fixed slots for the baseband boards of different modes in advance. For example, allocate slots 1 to 4 for the WCDMA baseband boards and slots 5 to 8 for the GSM baseband boards. Compared with the first solution, the second solution saves sites and cabinets.

In the second solution, the existing equipment and air interface resources may be reused. Thus, in the radio access field, radio network operators need to use the base stations that support multiple radio access technologies, that is, multi-mode base stations.

In general, radio resource parameters need to be configured for single-mode base stations, while multiple radio resources and the radio access modes that the base stations adopt need to be configured for multi-mode base stations. That is, the multi-mode base station has one more configuration dimension than the single-mode base station and thus the configuration workload of the multi-mode base station increases. In general, a multi-mode base station is made up of multiple single-mode base stations that are simply stacked together, and the configuration process is also a combination of the configuration processes of multiple single-mode base stations. Different configuration files are used in the same base station. How to use these configurations is decided by working personnel.

To enable a base station to support a new mode, working personnel need to download the software related to the mode to the base station. When it is necessary to change a mode or adjust the percentage of modes in a multi-mode base station, the configuration files must be delivered again, which makes the operations more complex.

In addition, the configuration files are relatively static and are used for specific equipment modules. During mode change or adjustment, relevant software needs to be manually downloaded and the configuration files need to be manually delivered, which is complex.

SUMMARY OF THE INVENTION

Embodiments of the present invention provide a method and system for configuring a multi-mode base station so that a network system may specify a radio access mode for a base station.

A method for configuring a multi-mode base station includes:
  acquiring resource capability information of a base station;
  determining a mode for the base station according to network planning and the resource capability information;
  generating a configuration file for the base station according to the determined mode; delivering the configuration file to the base station; and
  configuring relevant resources of the base station according to the configuration file.

A system for configuring a multi-mode base station includes:
  a configuration control unit, configured to report resource capability information of a base station to which the configuration control unit belongs to a configuration decision unit, and configured to configure relevant resources of the base station according to a configuration file sent by the configuration decision unit;
  the configuration decision unit, configured to determine a mode for the base station according to network planning and the reported resource capability information, generate the configuration file for the base station according to the determined mode, and deliver the configuration file to the configuration control unit.

A base station includes: a configuration control unit, configured to report resource capability information of the base station, and configure relevant resources of the base station according to a received configuration file.

In the technical solution of the present invention, the base station reports its resource capabilities. The configuration decision unit determines a mode for the base station according to network planning and the reported resource capabilities, generates a configuration file according to the determined mode, and delivers the configuration file to the base station. After receiving the configuration file, the base station configures relevant resources so that the network system may automatically specify a radio access mode for the base station and configure the information related to the radio access mode and the radio resources.

One or more radio access modes may be set for a base station. The configuration file contains the configured radio resource data, the mode used by the base station, and the configurations related to the used mode. In this way, the base station that supports multiple radio access technologies may automatically specify a radio access mode, which avoids complex manual configuration.

The base station sends a configuration request during initial startup to implement automatic configuration. At daily startup, the base station reports resource capabilities and the existing configuration file to check whether the current configurations are valid.

In addition, when the algorithm or basis for generating a configuration file changes, all the subordinate base stations are notified of the change. Each subordinate base station applies for a new configuration file and configures relevant resources according to the new configuration file. This further ensures the accuracy of the resources automatically configured by the base station.

BRIEF DESCRIPTION OF THE DRAWINGS

FIG. 1 shows a method for configuring a multi-mode base station according to a first embodiment of the present invention.

DETAILED DESCRIPTION OF THE INVENTION

The following describes the specific embodiments of the present invention in detail with reference to accompanying drawings.

For better understanding of the objective, technical solution and merits of the present invention, the following describes the present invention in detail with reference to the accompanying drawings.

In the embodiments of the present invention, the modes supported by a base station include, but not limited to, GSM, CDMA, worldwide interoperability for microwave access (WiMAX), WCDMA, time division synchronous code division multiple access (TD-SCDMA), CDMA2000, personal handyphone system (PHS), long term evolution (LTE), and air interface evolution (AIE).

The following describes the first embodiment of the present invention in detail. The embodiment relates to a method and system for configuring a multi-mode base station.

The system in this embodiment includes a configuration control unit, a configuration decision unit, and a configuration server. The configuration control unit is configured to report resource capabilities and configure relevant resources of the base station. The configuration decision unit is configured to generate a configuration file for the base station and deliver the configuration file to the base station. The configuration server is configured to store software and files matching software required to configure various modes. In general, the configuration control unit is within the base station. That is, the configuration control unit reports the resource capabilities of the base station to the configuration decision unit. The configuration decision unit determines a mode for the base station according to network planning and the reported resource capabilities, generates a configuration file according to the determined mode, and delivers the configuration file to the base station. The configuration control unit of the base station configures relevant resources of the base station according to the received configuration file. If the base station does not have the software and/or files matching software required to configure relevant resources of the base station, the configuration control unit requests the required software and/or files matching software from the configuration server. The configuration server and the configuration decision unit may be in any position on a network. They may be located in a base station or in other NEs, or be an independent entity on a network.

The following describes in detail the dynamic working process of the system, that is, the method for configuring the multi-mode base station.

Step 101: As shown in FIG. 1, the configuration control unit discovers and collects physical resources such as boards and modules so that it may report the resource capabilities of the base station where the configuration control unit resides to the configuration decision unit. Specifically, the base station does not have any configuration file during initial startup and needs to acquire a configuration file from the configuration decision unit. Thus, the configuration control unit first needs to discover and collect physical resources so that it may report the resource capabilities of the base station where the configuration control unit resides to the configuration decision unit. The reported resource capabilities may include the equipment type of the base station, site ID of the base station and the capability information related to various modes.

Step 102: The configuration control unit reports the resource capabilities to the configuration decision unit to request the corresponding configuration file.

Steps 103 and 103': The configuration decision unit determines a mode for the base station according to network planning and the reported resource capabilities, generates a configuration file for the base station according to the determined mode, and delivers the configuration file to the base station. The configuration decision unit may coordinate the distribution of resources of various modes on the entire network according to the network planning data. Thus, the configuration decision unit may generate a base station-level configuration file and deliver the configuration file to the base station. In this way, the base station may automatically specify a radio access mode and configure the information related to the radio access mode and the radio resources. The configuration decision unit may determine one or more modes for the base station.

Specifically, the configuration decision unit stores in advance the corresponding relationship between the equipment types, supported modes, required software and files matching software, such as the corresponding relationship table of the equipment types, supported modes, and required software and files matching software, and the corresponding relationship between the site IDs of the base station, modes, and radio resource data during network planning, such as the corresponding relationship table of the site IDs, modes, and radio resource data. After receiving the configuration request sent from the configuration control unit, that is, the reported resource capabilities, the configuration decision unit resolves the site ID, equipment type, support capability, and quantity from the reported resource capabilities. Then the configuration decision unit acquires the corresponding mode and radio resource data according to the site ID and acquires the supported modes and required software and files matching software according to the equipment type. The configuration decision unit determines a mode for the base station according to the acquired mode, radio resource data, supported modes, required software, files matching software and generates a corresponding configuration file. The generated configuration file includes the mode used by the base station, configurations related to the used mode, required software, files matching software, and configured radio resource data.

In this way, the base station that supports multiple radio access technologies may automatically specify a radio access mode, which avoids complex manual configuration.

For example, the mode acquired according to the site ID is WCDMA and the supported modes acquired according to the equipment type are WCDMA, GSM, and CDMA2000. Thus, the configuration decision unit determines WCDMA as the mode of the base station, generates a configuration file for the base station according to the determined mode acquired radio resource data, required software and files matching software, and delivers the configuration file to the base station. If the mode acquired according to the site ID is not included in the supported modes acquired according to the equipment type, the configuration decision unit may report a configuration error to a network management system (NMS).

The configuration decision unit may be classified into two levels when the base station has powerful capabilities. The level-1 configuration decision unit is deployed inside the network to allocate the modes and radio resource data of the base station; the level-2 configuration decision unit is deployed inside the base station to allocate the required software and files matching software of the base station.

Step 104: The base station prepares for relevant configuration. That is, the base station adjusts the running mode of physical resources according to the received configuration file.

If the software and/or files matching software required by the mode to be configured do not exist, the configuration control unit of the base station needs to request the required software and/or files matching software from the configuration server. In this embodiment, the base station does not have the software and/or files matching software required to configure relevant resources of the base station. Thus, the configuration control unit needs to request the required software and/or files matching software from the configuration server and the configuration server delivers the requested software and/or files matching software to the configuration control unit, as described in steps 105 and 105'.

Step 106: The configuration control unit installs the downloaded software and/or files matching software on physical resources.

Step 107: The configuration control unit configures relevant resources of the base station according to the received configuration file. That is, the configuration control unit sets the parameters in the configuration file on the base station to validate the configurations. This shows that the configuration control unit of the base station reports the resource capabilities to the configuration decision unit to request the corresponding configuration file immediately after the base station is started so that the base station is configured automatically.

A second embodiment of the present invention relates to a method and system for configuring a multi-mode base station. The mainly difference between the first embodiment and the second embodiment is that a configuration check process is added in the second embodiment.

Specifically, after the base station is started, the configuration control unit discovers and collects physical resources such as boards and modules and reports resource capabilities and the existing configuration file to the configuration decision unit. According to network planning and the reported resource capabilities and configuration file, the configuration decision unit checks whether the configuration file is valid. If the configuration file is valid, the configuration decision unit instructs the base station to continue to run according to the existing configuration file. If the configuration file is invalid, the configuration decision unit regenerates a configuration file according to network planning and the reported resource capabilities and delivers the configuration file to the configuration control unit. According to the regenerated configuration file, the configuration control unit configures relevant resources. In the configuration check process, the method for generating a configuration file and the method for the configuration control unit of the base station to configure relevant resources according to the configuration file are the same as the methods described in steps 102 to 107 in the first embodiment and are not described further.

This shows that, after the base station is started, the configuration control unit reports resource capabilities and the existing configuration file to the configuration decision unit to check whether the current configurations are valid.

A third embodiment of the present invention relates to a method and system for configuring a multi-mode base station. The mainly difference between the third embodiment and the second embodiment is that a base station configuration change process is added in the third embodiment.

Specifically, when the algorithm or basis for generating a configuration file changes, the configuration decision unit instructs the change to the configuration control units of all the subordinate base stations. The configuration control unit of each subordinate base station applies for a new configuration file from the configuration decision unit and configures relevant resources according to the new configuration file to further ensure the accuracy of the resources automatically configured by the base station.

A fourth embodiment of the present invention relates to a method for configuring a multi-mode base station.

In this embodiment, the base station first reports its resource capabilities. The reported resource capabilities include the equipment type of the base station, site ID of the base station, and capability information related to various modes.

Then the network system determines a mode for the base station according to network planning and the reported resource capabilities, generates a configuration file for the base station according to the determined mode, and delivers the configuration file to the base station. The configuration file includes the mode used by the base station, configurations related to the used mode, required software and files matching software, and configured radio resource data. In this way, the network system may automatically specify a radio access mode for the base station and configure the information related to the radio access mode and the radio resources.

Specifically, the network system stores in advance the corresponding relationship between site IDs, modes, and radio resource data during network planning and the corresponding relationship between equipment types, supported modes, and required software and files matching software. According to the corresponding relationship and the site ID and equipment type in the reported resource capabilities, the network system acquires the corresponding mode, radio resource data, supported modes, and required software and files matching software. According to the acquired information, the network system generates a configuration file for the base station and delivers the configuration file to the base station. The network system may determine one or more modes for the base station according to the acquired information (such as the mode and supported modes). In this way, the base station that supports multiple radio access technologies may automatically specify a radio access mode, which avoids complex manual configuration.

Finally, the base station configures relevant resources according to the received configuration file. If the base station does not have the software and/or files matching software required to configure relevant resources of the base station, the base station may request the required software and/or files matching software from other network entities that store the software packages and files matching software required by various modes.

The base station may send a configuration request during initial startup to implement automatic configuration. At daily startup, the base station may report resource capabilities and the existing configuration file to the network system so that the network system may check whether the configuration file is valid according to network planning and the reported resource capabilities and configuration file. If the configuration file is valid, the network system instructs the base station to continue to run according to the existing configuration file. If the configuration file is invalid, the network system regenerates a configuration file and instructs the base station to configure relevant resources according to the regenerated configuration file. When the algorithm or basis for generating a configuration file changes, all the subordinate base stations are notified of the change. Each subordinate base station applies for a new configuration file and configures relevant resources according to the new configuration file to further ensure the accuracy of the resources automatically configured by the base station.

Those skilled in the art may understand that all or part of the modules or steps in the preceding embodiments may be completed by hardware following instructions of a program. The program may be stored in a computer readable storage medium such as a read-only memory/random access memory (ROM/RAM), a magnetic disk or a compact disk. Or all or part of the modules or steps in the preceding embodiments may be fabricated into various integrated circuit modules or into a single integrated circuit module for implementation. The present invention is not limited to any specific combination of hardware and software.

The preceding embodiments are used to describe and explain the principles of the present invention, and not intended to limit the present invention. It is apparent that those skilled in the art may make various modifications and variations to the invention without departing from the spirit and scope of the invention. The invention is intended to cover the modifications and variations provided that they fall in the scope of protection defined by the claims or their equivalents.

What is claimed is:

1. A method for configuring a multi-mode base station, comprising:
    acquiring physical resource capability information of a base station, wherein the physical resource capability information comprises: equipment type of the base station site ID of the base station, and capability information related to various radio access modes;
    determining a radio access mode for the base station according to network planning and the physical resource capability information;
    generating a configuration file for the base station according to the determined radio access mode; and
    configuring relevant resources of the base station according to the configuration file.

2. The method according to claim 1, wherein the determining of the radio access mode for the base station comprises:
    determining the radio access mode for the base station according to the physical resource capability information of the base station and a stored corresponding relationship between site IDs of base stations, radio access modes and radio resource data.

3. The method according to claim 1, wherein the configuration file comprises:
    the radio access mode used for the base station, configuration information related to the used radio access mode, required software, files matching software, and radio resource data.

4. The method according to claim 3, wherein the generating of the configuration file for the base station comprises:
    acquiring the radio access mode and radio resource data corresponding to the site ID of the base station according to the stored corresponding relationship between site IDs of base stations, radio access modes and radio resource data;
    acquiring a supported radio access mode of the base station, a required software, and a files matching software corresponding to equipment type according to a stored corresponding relationship between equipment type, the supported radio access mode, required software, and files matching software; and
    generating the configuration file according to the acquired radio access mode, the radio resource data, the supported radio access mode, the required software, and the files matching software.

5. The method according to claim 1, further comprising:
    requesting a required software and/or files matching software, if the base station does not have the required software and/or files matching software used to configure the relevant resources.

6. The method according to claim 1, wherein the acquiring of the resource capability information of the base station comprises: acquiring the physical resource capability of the base station when starting the base station.

7. The method according to claim 6, further comprising:
    acquiring an existing configuration file when the base station is started;
    checking whether the existing configuration file is valid or not according to the network and the resource capability information, if the existing configuration file is valid, instructing the base station to operate according to the existing configuration file; if the existing configuration file is not valid, regenerating a configuration file and instructing the base station to configure relevant resources according the regenerated configuration file.

8. The method according to claim 1, further comprising:
    instructing all subordinate base stations of the change of algorithm or basis for generating a configuration file;
    applying for, by each of the subordinate base stations, a new configuration file, and reconfiguring relevant resources according to the new configuration file.

9. A system for configuring a multi-mode base station, comprising:
    a configuration control unit, configured to report physical resource capability information of a base station to a configuration decision unit which the configuration control unit belongs to, wherein the physical resource capability information comprises: equipment type of the base station, site ID of the base station, and capability information related to various radio access modes, and configured to configure relevant resources of the base station according to a configuration file sent by the configuration decision unit;
    the configuration decision unit, configured to determine a radio access mode for the base station according to network planning and the reported physical resource capability information, generate the configuration file for the base station according to the determined radio access mode, and deliver the configuration file to the configuration control unit.

10. The system according to claim 9, wherein,
the configuration file comprises: the radio access mode used for the base station, configuration information related to the used radio access mode, required software, files matching software, and radio resource data.

11. The system according to claim 9, wherein the configuration decision unit is configured to:
acquire a radio access mode and radio resource data according to the site ID reported in the physical resource capability information and a stored corresponding relationship between site IDs of base stations, radio access modes and radio resource data;
acquire a supported radio access mode of the base station, a required software, and a files matching software according to the equipment type reported in the physical resource capability information and a stored corresponding relationship between equipment type, the supported radio access mode, required software, and files matching software; and
generate the configuration file according to the acquired radio access mode, the radio resource data, the supported radio access mode, the required software, and the files matching software.

12. The system according to claim 9, wherein
the system further comprises: a configuration server, configured to store software and/or files matching software required to configure various modes;
and the configuration control unit is further configured to request the required software and/or files matching software from the configuration server when the base station does not have the software and/or files matching software required to configure the relevant resources of the base station.

13. A base station, comprising:
a configuration control unit, configured to report physical resource capability information of the base station, wherein the physical resource capability information comprises: equipment type of the base station, site ID of the base station, and capability information related to various radio access modes, and configure relevant resources of the base station according to a received configuration file, wherein the received configuration file is generated according to a radio access mode for the base station, the radio access mode is determined according to network planning and the reported physical resource capability information.

14. The base station according to claim 13, further comprising: a configuration decision unit, configured to determine the radio access mode for the base station according to the physical resource capability information reported by the configuration control unit and the network planning, generate the configuration file for the base station according to the determined radio access mode, and deliver the configuration file to the configuration control unit.

15. The base station according to claim 14, wherein
the base station further comprises: a configuration server, configured to save software and/or files matching software required to configure various modes;
and the configuration control unit is further configured to request the required software and/or files matching software from the configuration server when the base station does not have the software and/or files matching software required to configure the relevant resources of the base station.

* * * * *